United States Patent
Kushida et al.

(10) Patent No.: US 6,559,909 B1
(45) Date of Patent: May 6, 2003

(54) APPLICATION OF LIGHT SOURCE INCLUDING LIGHT GUIDE FOR EMANATING LINEARLY POLARIZED LIGHT TO LIQUID CRYSTAL DISPLAY WITH HAZE ANISOTROPY

(75) Inventors: Takashi Kushida, Tokyo (JP); Akihiko Uchiyama, Tokyo (JP); Tatsuichiro Kon, Tokyo (JP); Kazuo Yahata, Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/554,274
(22) PCT Filed: Sep. 16, 1999
(86) PCT No.: PCT/JP99/05045
§ 371 (c)(1), (2), (4) Date: May 12, 2000
(87) PCT Pub. No.: WO00/16154
PCT Pub. Date: Mar. 23, 2000

(30) Foreign Application Priority Data

Sep. 16, 1998 (JP) .......... 10-261688
Dec. 28, 1998 (JP) .......... 10-373365
Jun. 3, 1999 (JP) .......... 11-156496

(51) Int. Cl.$^7$ .......... G02F 1/1335
(52) U.S. Cl. .......... 349/62; 349/64
(58) Field of Search .......... 349/61–71

(56) References Cited

U.S. PATENT DOCUMENTS

RE35,704 E * 12/1997 Chiba et al. .......... 359/619
5,867,316 A 2/1999 Carlson et al.
6,166,793 A * 12/2000 Hayashi et al. .......... 349/112
6,310,671 B1 * 10/2001 Larson .......... 349/86

FOREIGN PATENT DOCUMENTS

JP 5-045519 2/1993
JP 8-076114 3/1996

(List continued on next page.)

OTHER PUBLICATIONS

"Anisotropic Scattering Polarizer for LCDs" by Miyatake et al., IDW'98, p. 247–250.
"Optical Properties of Stretched Polymer Dispersed Liquid Crystal Films: Angle–Dependent Polarized Light Scattering" by O. Aphonin, Liquid Crystals, 1995 vol. 19, No. 4, pp. 469–480.

(List continued on next page.)

Primary Examiner—Robert H. Kim
Assistant Examiner—Timothy L. Rude
(74) Attorney, Agent, or Firm—Sughrue Mion, PLLC

(57) ABSTRACT

The present invention relates to a liquid crystal display element having improved utilization efficiency of light and a light source device constituting the liquid crystal display element, and said liquid crystal display element includes (I) a light source device comprising the following (i) to (iii):
  (i) a light guide body comprising a transparent medium, and having an end face through which the light emitted from a light source is introduced, a pair of opposing faces one of which works as a light emission face and a haze anisotropic layer,
  (ii) a light source placed at the end face of said light guide body, and
  (iii) a reflecting body placed at the opposite side to the light emission face side of said light guide body, and mainly emitting linearly polarized light of one vibration direction, and
(II) a polarizing plate placed at the emission face side of the above-mentioned light guide body in such a manner that the polarization axis is parallel to the direction having the largest haze value in the above-mentioned haze anisotropic layer.

21 Claims, 4 Drawing Sheets

FOREIGN PATENT DOCUMENTS

| JP | 8-271892 | 10/1996 |
|----|----------|---------|
| JP | 9-274108 | 10/1997 |
| JP | 09-297204 | * 11/1997 |
| JP | 9-297204 | 11/1997 |
| JP | 10-096816 | 4/1998 |
| JP | 11-133409 | 5/1999 |
| WO | WO97/32224 | 9/1997 |
| WO | WO97/32226 | 9/1997 |
| WO | WO97/32227 | 9/1997 |

OTHER PUBLICATIONS

Advanced Materials 10, No. 12, 1998.

"Optical Properties of Stretched Polymer Dispersed Liquid Crystal Films".

* cited by examiner

Figure 1
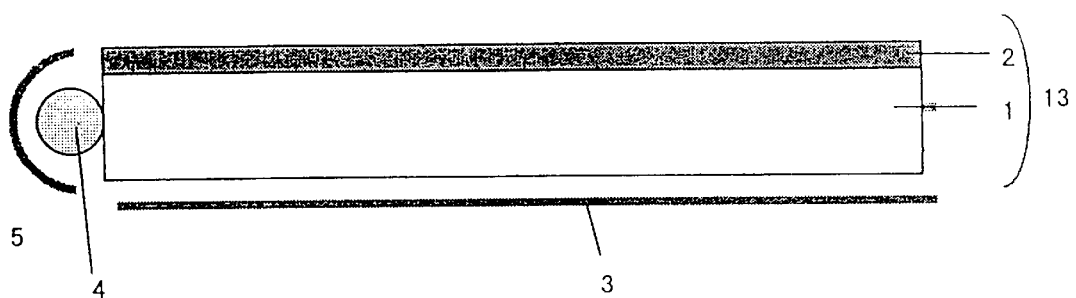
Fiure 2
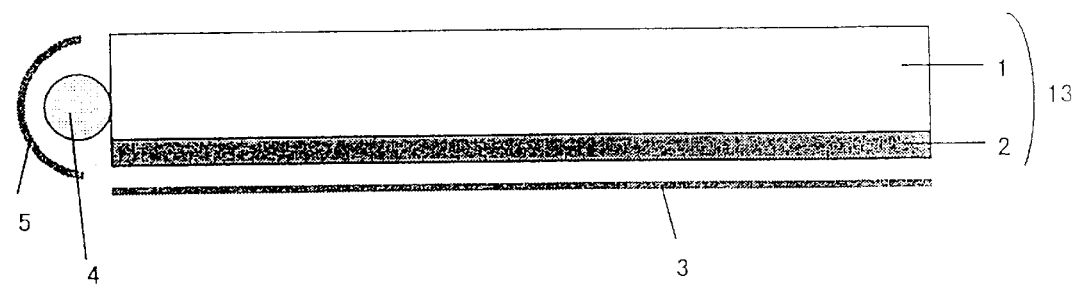

Figure 6-a
Example 16
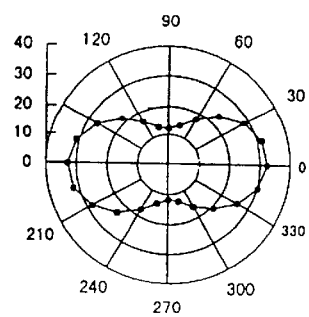
degre of polarization
=49%
Figure 6-b
Example 17
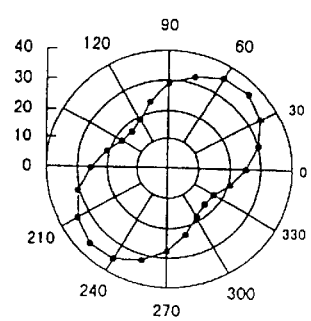
degree of polarization
=39%
Figure 6-c
Example 18
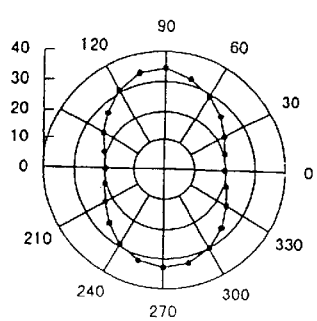
degree of polarization
=25%
Figure 6-d
Example 19
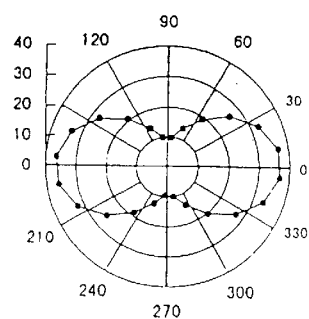
degree of polarization
=58%
Figure 6-e
Example 20
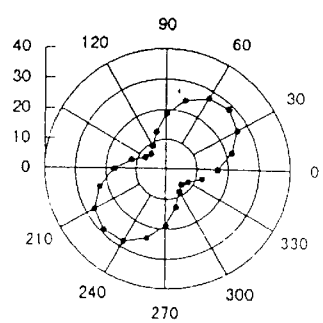
degree of polarization
=60%
Figure 6-f
Example 21
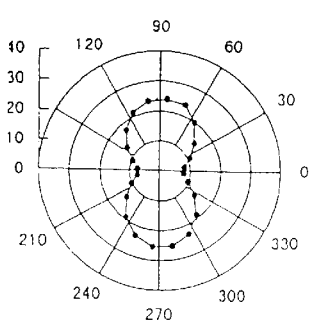
degree of polarization
=53%

APPLICATION OF LIGHT SOURCE INCLUDING LIGHT GUIDE FOR EMANATING LINEARLY POLARIZED LIGHT TO LIQUID CRYSTAL DISPLAY WITH HAZE ANISOTROPY

TECHNICAL FIELD

The present invention relates to the application of a light source device including a linearly polarized light-emitting light guide body to a liquid crystal display element. More specifically, it relates to a light source device having improved utilization efficiency of light in an image displaying device using linearly polarized light by emitting the linearly polarized light of one direction, a liquid crystal display element including the light source device as a constituting element and a light guide body constituting the light source device.

BACKGROUND ART

A liquid crystal display device has characteristic features that it is thin in thickness and light in weight, and has small power consumption because of low voltage driving, and it is growing rapidly as a potential picture information display device.

A liquid crystal display element is generally constructed with a cell holding twisted liquid crystal between a pair of base boards and polarizing plates placed at both the sides of the cell in such a manner that the polarization axes orthogonally cross each other. An example of the polarizing plate is a dichroic polarizing plate using an oriented dichroic pigment such as a PVA-iodine system. The dichroic polarizing plate selectively absorbs only one linearly polarized light component out of a pair of polarized components orthogonally crossing each other and transmits only the other linearly polarized light component, and thereby unpolarized light is converted into linearly polarized light.

In a liquid crystal display device, unpolarized light emitted from a backlight light source is at first converted into linearly polarized light by a polarizing plate placed at the opposite side of the cell (backlight side). The converted light rotates the axis along the twist of liquid crystal molecules in the liquid crystal cell, and thereby it is not absorbed by the polarizing plate placed at this side of the liquid crystal cell (observer side) and observed as display light. When a voltage is applied on the liquid crystal cell, the liquid crystal molecules are aligned in the electric field direction with the result of disappearing of the twist of the molecules and the polarized light transmitted through the liquid crystal cell is absorbed by the polarizing plate at the observer side.

The utilization efficiency of light in a liquid crystal display device is regulated mainly by (1) the light transmittance of the polarizing plate, (2) the numerical aperture of a liquid crystal panel and (3) the light transmittance of a color filter. When the light utilization efficiency is low, the contrast (relative luminance) of image light becomes low, and as a result, the display quality becomes poor. On the other hand, when the output of the backlight light source is increased, the contrast of the image light is increased, but the power consumption is increased, and it causes a trouble of the shortening of driving time especially in the case of a portable instrument.

Further, a method for collecting light by using a prism sheet or the like has been proposed for increasing the contrast of image light, but although the contrast in the front direction is improved, the luminance in other directions is extremely lowered, and this opposes the recent trend of wide viewing angle.

The largest regulating factor in the utilization efficiency of light is the light transmittance of a polarizing plate. In the process of extracting linearly polarized light out of light-source light (unpolarized light) by the polarizing plate, theoretically 50% light or more is lost. If it becomes possible that the light-source light is converted into linearly polarized light having a vibration plane which coincides with the vibration plane of linearly polarized light which transmits through the polarizing plate, the utilization efficiency of the light will be extremely improved.

For example, U.S. Pat. No. 3,610,729 discloses a method which separates linearly polarized light of only one direction, and reflects the linearly polarized light of the direction perpendicular to the separated one and reuses the reflected one by using of an optical film prepared by laminating two kinds of films into a multilayer. Further, European Patent 606940A2 and D. J. Broer, J. A. M. M. van. Haare, G. N. Mol and F. Leenhouts; Asia Display '95, 735 (1995) disclose methods for increasing the utilization efficiency of light by selectively transmitting circularly polarized light of only one direction, reflecting the circularly polarized light of the other direction and reusing it using a cholesteric liquid crystal and a ¼ wave length plate.

These methods have high effect regarding conversion efficiency to polarized light or the utilization efficiency of light, but they have problems that the production of such a light source device is difficult since strict high-order structure is required, and the light source device becomes expensive.

Further, WO 92/22838 and F. M. Weber; SID 93 DIGEST, 669 (1993) disclose methods for separating polarized light by using Brewster angle. These methods can be applied at a relatively low cost, but their polarized-light conversion efficiencies are not sufficient, and further the efficiency depends largely on the emission angle of polarized light, and the kinds of the linearly polarized light to be obtained is limited.

JP-A 6-331824 (JP-A means Japanese unexamined patent publication) and JP-A 9-292530 disclose methods for separating polarized light based on the fact that the difference between refractive indexes at boundary varies depending on the direction of polarized light by using a layer having refractive index anisotropy in a light guide plate. These methods are also insufficient in polarized-light conversion efficiencies, and the utilization efficiencies of light are not high. They also have a problem that the refractive index anisotropy is limited by a material.

Further, O. A. Aphonin, et al.; Liq. Cryst., 15, 3, 395 (1993), O. A. Aphonin; Liq. Cryst., 19, 4, 469 (1995), JP-A 8-76114 and JP-A 9-274108 disclose methods using an anisotropic scatterer, in which liquid crystal is aligned by stretching a composite of a polymer and a liquid crystal, as a scatter-type polarizing plate. Furthermore, WO97/32222, WO97/32224, WO97/32226, WO97/32227, U.S. Pat. No. 5,867,316, H. Yagt, et al.; Adv. Mater., 10, 2, 934 (1998) and M. Miyatake, et al.; IDW '98, 247 (1998) disclose methods also for obtaining a scatter-type polarizing plate by stretching an incompatible polymer blend film.

Further, JP-A 9-297204 discloses an anisotropic scatter element consisting of a stretched film in which titanium oxide having an aspect ratio of 1 or more as a component exhibiting anisotropic scattering is aligned in one direction. It describes that the light becomes the most dark when the polarization axis and the scattering axis (stretched direction) come to coincide with each other by rotating a polarizing plate on the element, and the light becomes the most bright when they become perpendicular to each other (the polarization axis and the transmitting axis come to coincide with each other).

These technologies use a method for separating polarized light by passing the polarized light of the direction (transmission axis) in which the refractive index of titanium dioxide particles and the refractive index of the polymer come to coincide with each other due to stretching or the like, and scattering backward the polarized light of the direction (scattering axis) in which the refractive indexes are not coincident with each other, that is, a method using a so-called scatter-type polarizing plate. The theory of this polarized light separation is fundamentally different from that of the objective light source device of the present invention. In the case of these technologies, since the polarized light of the direction of scattering axis must be scattered backward without scattering forward, it is required to have multiple scattering or the like by increasing scattering factors, and as a result, it becomes difficult to keep the transmittance in the direction of transmitting axis at high level. Further, in order to improve luminance, backward scattering light must be depolarized and reused; however, in the case of the scatter-type polarizing plate, a reusing ratio of light is low since the amount of dissipation light is large due to scattering, and the improving effect of luminance is low compared with a polarization degree.

WO97/32222 describes an optical film (scatter-type polarizing film) separating polarized light by using transmission/non-transmission due to scattering. The linearly polarized light of the scattering axis direction is made non-transmitting due to backward scattering by using the optical film, and the linearly polarized light of the direction of the transmission axis is transmitted, and as the result, the polarized light is separated. Therefore, in order to increase the capability of polarized-light separation, it is required to make the difference of transmittances as large as possible; ideally $TT_{max} \gg TT_{min} \sim 0$. The publication describes that the optical film has a diffusion reflectivity of 30% or more in the scattering axis direction.

DISCLOSURE OF THE INVENTION

The object of the present invention is to provide a new liquid crystal display element including a light source device converting unpolarized light into linearly polarized light.

Another object of the present invention is to provide a new light source device having high light utilization efficiency suitable for the above liquid crystal display element.

Still another object of the present invention is to provide a new light guide body constituting the above light source device of the present invention.

Yet another object of the present invention is to provide a light guide body emitting linearly polarized light converted out of the unpolarized light introduced from a light source.

Yet further object of the present invention is to provide the application of a haze anisotropic film in a light guide body.

The inventors of the present invention pursued zealous study, and as a result, they found that when a haze anisotropic layer is placed on a surface of a light guide body, light containing a large amount of linearly polarized light components in one vibration direction is emitted, and the vibration direction is coincident with the scattering axis of such a haze anisotropic layer, that is, the direction where the haze is the largest. The present invention is completed based on such finding.

Further, the light source device of the present invention was provided for the first time base on the following fact which had been found first by the inventors of the present invention: the emitted light is mainly composed of forward scattered light of specific linearly polarized light; it is basically free from backward scattered light and transmitted light; and the vibration plane of the emitted linearly polarized light can be selected by the light scattering property of a haze anisotropic layer.

In the present invention, the above-mentioned objects and advantageous points of the present invention are attained by a liquid crystal display element including (I) a light source device comprising the following (i) to (iii):
  (i) a light guide body comprising a transparent medium, and having an end face through which the light emitted from a light source can be introduced, a pair of opposing faces one of which works as a light emission face and a haze anisotropic layer, wherein the haze value is expressed by the following formula (1) when an incident light is lineally polarized light, $$H(\%) = DF/TT \times 100 \qquad (1)$$

here, DF is a diffused light transmittance, and TT is a total light transmittance;
  (ii) a light source placed at the end face of said light guide body, and
  (iii) a reflecting body placed at the opposite side of the light emission face side of said light guide body, and
(II) a polarizing plate placed at the light emission face side of the said light guide body in such a manner that the polarization axis is parallel to the direction having the largest haze value in said haze anisotropic layer.

BRIEF DESCRIPTION OF THE DRAWINGS

FIG. 1 is an example of a basic structure of the light source device of the present invention.

FIG. 2 is an example of a basic structure of the light source device of the present invention.

FIGS. 6 exhibit the profiles of polarized lights of Examples 16 to 21.

EXPLANATION OF THE MARKS

Figure 3:
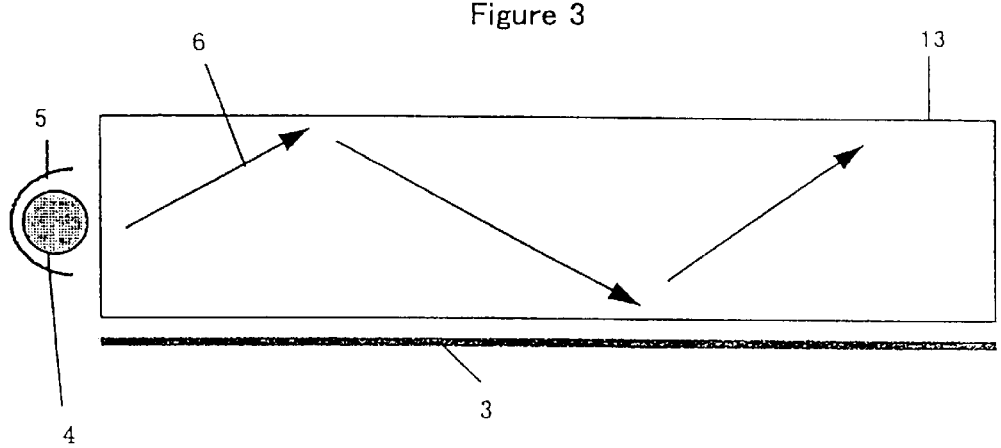
FIG. 3 is an explanation of a light guide body.

1. A transparent medium.
2. A haze anisotropic layer.
3. A reflecting plate.
4. A light source lamp.
5. A lamp reflector.
6. Propagating direction of light.
7. Linearly polarized light.
8. Scattering anisotropic factor.
9. An example of an atypical light guide body.
10. A light source.
11. A transparent medium.
12. A haze anisotropic layer.
13. A light guide body.

BEST MODE FOR CARRYING OUT THE INVENTION

The liquid crystal display element of the present invention includes a light guide body comprising a transparent medium and a light source device comprising mainly a light source and a reflecting body, and a polarizing plate is placed at the light emission face side of said light guide body. The light emitted from the light source is converted into linearly polarized light having polarization axis mainly in one direction, and then the linearly polarized light is emitted from the light source device. By placing the polarizing plate at the emission face side of the light guide body, that is, between the light guide body and a liquid crystal cell in such a manner that the emitted polarized light and the polarization axis becomes parallel to each other, the utilization efficiency of light can be increased.

The light source of the present invention is used to emit light into a light guide body, and placed at the end face of the light guide body or at the neighbor of the end face. In the case of a surface light source device which uses a light guide plate as the light guide body, a cold cathode fluorescent lamp(CFL) having same length as the end face of said light guide plate can be used as the light source. Further, in order to increase the amount of emitted light from the light guide body, a reflecting material is optionally placed at the opposite side to the end face of the light source.

The liquid crystal display element of the present invention commonly has a reflecting body at the opposite side to the emission face of polarized light. The reflecting body may be placed at all faces excluding the end face of the light guide body where the light source is placed and the emission face. In the case of a surface light source device, a tabular or laminar reflecting plate is commonly suitable as the reflecting body although it depends on the shape of the light source device. The reflecting body does not have special limitation, but a reflecting body having no birefringence is preferred from the view point that it does not disturb polarized light. A reflecting body having a biaxially stretched film or the like at the outermost surface of a reflection face is not preferred because the reflecting body disturbs polarized light. A preferable example of the reflecting body is a flat plate, sheet or film made of a metal, a film imparted with a metal thin film or the like. Each of these materials may be applied on a light guide body by using an adhesive or formed directly on the surface of a light guide body as a layer, for example, using a forming method by vapor deposition.

The light guide body of the present invention comprises a transparent medium and has an end face through which the light emitted from a light source can be introduced and a haze anisotropic layer. When used in a liquid crystal display element, it preferably has a pair of opposing faces one of which works as an emission face.

The transparent medium can be glass or a polymer having excellent transparency, for example, an acrylic resin, a polycarbonate resin or the like.

Such a light guide body can convert light, which has been introduced through the end face from above-mentioned light source, into linearly polarized light having a one-directional component and emit the linearly polarized light outside the light guide body.

Such a light guide body can be used as a light source device for backlight of the above-mentioned liquid crystal display device by combining it with a light source placed at its end face and optionally a reflecting body.

The light source device of the present invention emits linearly polarized light of a one-directional component out of the light (unpolarized light) introduced from a light source commonly through the end face into the light guide body, outside the light guide body and reuses the linearly polarized light of the component of other directions which has not been emitted, after depolarization.

Surface light source devices, which are representative examples of the present invention, are shown in FIGS. 1 and 2. Such a surface light source device is constituted of a light guide body (plate) 13 of an end-face light introducing-type, a cylindrical light source lamp 4 mounted at the end face of said light guide body and a reflecting body (plate) 3 mounted on the reverse face of said light guide body. On the light source lamp 4, a lamp reflector 5 is placed as a reflecting material.

Figure 7:
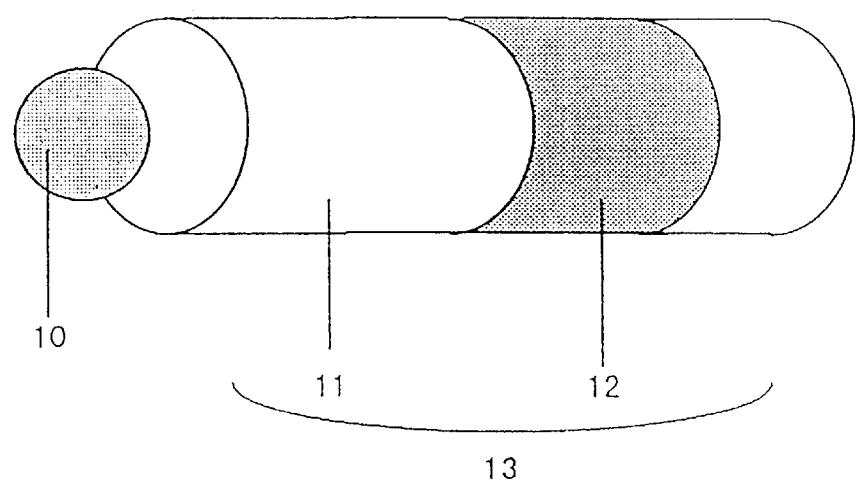
FIG. 7 is an example of the light guide body of the present invention.

Further, an example of the light source device of the present invention is shown in FIG. 7. The light source device is constituted of a columnar light guide body 13 of an end-face light introducing-type and a spherical light source lamp 10 mounted on the end face of said light guide body.

As one constituting element, the light source device of the present invention has a light guide body scattering linearly polarized light of one vibration direction out of unpolarized light which has been introduced into a light guide body from a light source and thereby emitting it outside the light guide body, and basically not emitting the linearly polarized light of other directions. This light guide body separates the linearly polarized light of one direction out of the light which has been introduced into the light guide body from the light source and emits it through a light emission face.

In the present invention, the light guide body is characterized in that it has a layer (called a haze anisotropic layer) having a haze anisotropy. In such a layer, the haze value varies depending on the vibration direction of linearly polarized light which is incident perpendicularly on the surface. The haze in the present invention is a value expressed by the following formula (1) when an incident light is linearly polarized light, $$H(\%)=DF/TT\times 100 \quad (1)$$

wherein DF is a diffused light transmittance, and TT is a total light transmittance. In other words, the haze expresses the ratio of diffused transmitted light to the total transmitted light, and the larger the value is, the easier in scattering the incident light is. Further, the anisotropy of the haze in the present invention means a phenomenon that, when the above-mentioned measurement is carried out letting linearly polarized light be the incident light, the efficiency of scattering varies depending on the vibration direction of the linearly polarized light.

The haze anisotropic layer of the present invention is a layer having properties satisfying the following formula when the haze is measured under the rotation of the polarization plane of linearly polarized light in a plane, $$H\max/H\min \geq 1.05 \quad (2)$$

wherein Hmax is a haze value of polarized light having the vibration plane in the direction having the largest haze value, and Hmin is a haze value of polarized light having the vibration plane in the direction having the smallest haze value. Further preferably, the following formula (2-1) is satisfied, $$H\max/H\min \geq 1.20 \quad (2\text{-}1)$$

and especially, it is ideal that Hmin is nearly zero.

Hereafter, the principle of the polarized light separation, which the inventors of the present invention assume, will be explained.

When light is introduced into a light guide body 13 shown in FIG. 3 through an end face of the light guide body at an incident angle smaller than the total reflection angle, the light propagates while repeating reflections at the boundary between air and the light guide body, and thereby the light usually is not emitted from other surfaces than the end face of the opposite side.

However, the light guide body of the present invention has a haze anisotropic layer 2 on a surface, for example, as shown in FIG. 1 and FIG. 2. In the present invention, a desired linearly polarized light can be arbitrarily selected by changing the direction of anisotropy in the in-plane direction of the haze anisotropic layer. Here, the principle is explained by taking an example of the case where the haze anisotropy has a high haze value against linearly polarized light having the vibration plane of electric field perpendicular to the face of the paper in FIG. 4, and a low haze value against linearly polarized light having the vibration plane of electric field parallel to the face of the paper. Out of unpolarized light propagating in a light guide body, polarized light components perpendicular to the face of the paper are scattered by a scattering anisotropic factor 8 in the haze anisotropic layer 2. A part of the scattered light is made incident on the boundary between the anisotropic layer and air at an angle larger than the critical angle, and as the result, it does not undergo total reflection, and emits from the light guide body 13 as polarized light. On the other hand, the polarized light component parallel to the face of the paper hardly undergoes scattering due to the scattering anisotropic factor 8, and thereby it is made incident on the boundary between the anisotropic layer and air at an angle smaller than the critical angle in the same manner as before and propagates through the light guide body under total reflection. The light emitting from the upper surface or the lower surface of FIG. 4 therefore becomes linearly polarized light always having the vibration plane of electric field perpendicular to the face of the paper, and as a result, it becomes possible to separate specific linearly polarized light out of unpolarized light. In addition, the polarized light which has not been emitted is depolarized by the birefringence due to the transparent medium 1 or the haze anisotropic layer 2, and it is reused as unpolarized light.

The light source device of the present invention, in this manner, obtains polarized light based on the principle that polarized light of the direction having a high haze (scattering axis) is scattered, and as a result, its incident angle is changed and polarized light is emitted by breaking the total reflection of the light guide body. It is no problem therefore whether it is forward scatter or back scatter; rather in order to keep high transmittance of the haze anisotropic layer itself, higher forward scattering property is preferred. Further, the polarized light of the direction having lower haze (transmitting axis), which has not been used, repeats total reflection at the surface of the light guide body since its incident angle has not been changed, and is kept confined in the light guide body without having a possibility of escape; and further, it is depolarized by the strong birefringence of the haze anisotropic layer itself and reused. The light source device of the present invention therefore has an extremely high utilization efficiency of light.

In the above explanation, in order to simplify the explanation, the principle is explained by taking a case where a haze value is high against linearly polarized light having the vibration plane of electric field perpendicular to the face of the paper, and a haze value is low against linearly polarized light having the vibration plane of electric field parallel to the face of the paper. However, the characteristic of the present invention is that linearly polarized light having the vibration plane of electric field in the high haze direction (scattering axis) of a haze anisotropic layer is always emitted. So, the light source device of the present invention can be applied, for example, in a TN (twisted nematic)-type liquid crystal display device requiring polarized light of the direction of 45° since the direction of the emitting linearly polarized light can be freely selected by changing the direction of scattering axis of the haze anisotropic layer as shown in the following Examples 16 to 21.

The above-mentioned haze anisotropic layer can be placed on an emission face (the opposite face to a reflecting body) through which polarized light is emitted (FIG. 1) in a light guide body, or it can be placed on the opposite side (the face for placing a reflecting body on) of an emission face (FIG. 2), or their combination is also allowed. In the case of the combination, it is preferred that the direction of the maximum haze of the haze anisotropic layer placed on the emission face side coincides with the direction of the maximum haze of the haze anisotropic layer placed at the opposite face side of the emission face, at the same time which is the emission face side of the reflection body.

As explained here, the light emitted from the above-mentioned light guide body of the present invention is obtained due to the scattering, preferably the forward scattering of linearly polarized light of one vibration direction, and linearly polarized light of other vibration directions than said one vibration direction is hardly emitted. Further, the emitted light is basically scattered light due to a haze anisotropic layer, and it is not non-scattered light of the haze anisotropic layer. This is largely different from the system in which the obtained linearly polarized light of one vibration direction is mainly based on non-scattered light, this is the case of WO97/32222, JP-A 8-76114 and JP-A 9-297204.

Figure 4:
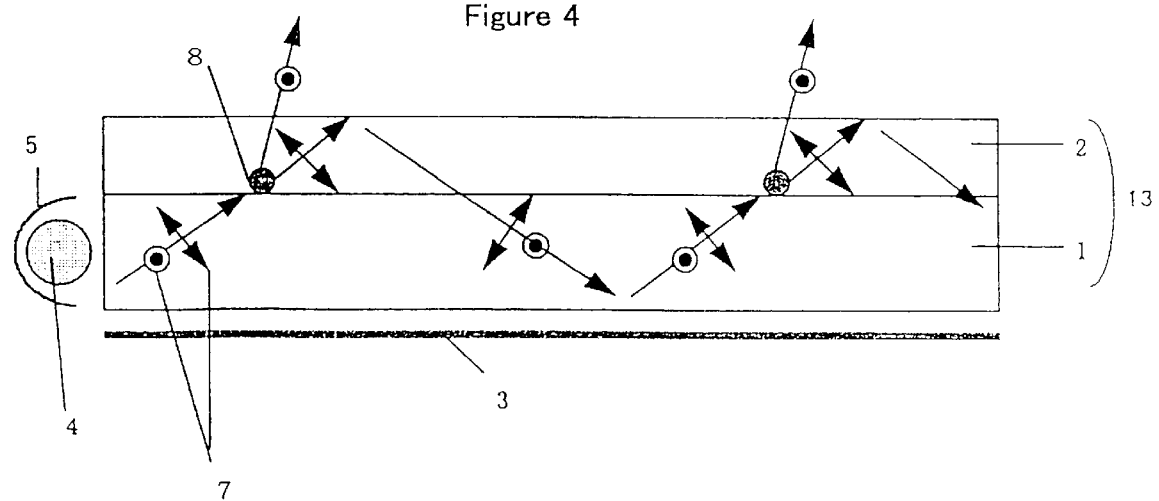
FIG. 4 is an explanatory figure of the polarized light separation mechanism of the present invention.
Figure 5:
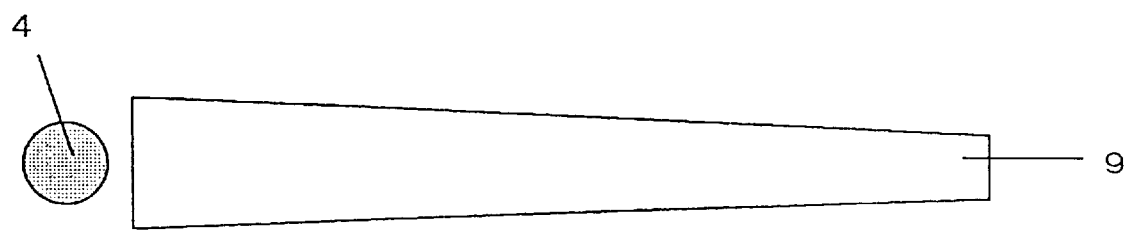
FIG. 5 is an example of the shape of a light guide body.

Explanations in FIGS. 1, 2 and 4, and the above explanation are made by taking a flat sheet-type light guide body as an example, but, when a light guide body is used as a light source device, there is no limitation in the shape of the light guide body. However, as explained above, since light (unpolarized light) emitted from a light source placed at the end face of a light guide body or near the end face is introduced through it, it is preferred that the light guide body has at least one end part having such a size that the light can enter through, and has two planes having a sufficiently large area relative to the thickness. Examples include a flat light guide body having a pair of opposing faces such as a film or a sheet, and one of the faces works as an emission face. The opposing faces are not necessarily parallel to each other, and one may be inclined against the other as shown in FIG. 5. The thickness of the light guide plate is usually 10 cm or less.

Further, for example, a wedge type light guide plate, a prism-attached light guide plate, a micro lens-attached light guide plate, a dot printed light guide plate or the like, whose emission properties are controlled beforehand, may be used as the light guide body. In the case of the wedge type light guide plate or the dot printed light guide plate, the above-mentioned haze anisotropic layer can be applied on either side of the pair of faces of the light guide body. On the other hand, in the case of the prism-attached light guide plate or the micro lens-attached light guide plate, the haze anisotropic layer is applied preferably on the face which has not been subjected to the prism processing or micro lens processing from the view point of processability.

The light guide body of the present invention includes a so-called light guide having a light-transmitting function such as an optical fiber or an optical wave guide.

There is no special limitation on the method for forming a haze anisotropic layer in the above-mentioned light guide body; however, examples include the methods in which a polymer film having haze anisotropy is applied on at least one face of a transparent medium through an adhesive layer, an oriented layer exhibiting liquid crystal property is directly applied to a light guide body, and the like. Especially, when such a film is used, it is important that the film becomes integrated into the transparent medium by means of an adhesive layer or the like, and a layer of air does not exist between the film and transparent medium.

The thickness of the haze anisotropic layer is sufficient as long as the above-mentioned effect is achieved; commonly, it is 0.1 to 200 μm, preferably 5 to 100 μm.

Regarding a film having haze anisotropy (in some case, this is referred as a haze anisotropic film), there is no special limitation, and examples of the film include (i) an oriented film of crystalline polymer, (ii) a polymer film in which liquid crystals are dispersed, (iii) an oriented film of a blend film made of a composition prepared by blending two or more kinds of polymers, and (iv) an oriented film made of a polymer containing transparent filler in an amount of 1 ppm to 30% by weight.

The oriented film of the group (i) is commonly obtained by stretching a film of a crystalline polymer. By strongly stretching a crystalline or semi-crystalline film of an amorphous state in a uniaxial direction, polymer chains are oriented to cause crystallization, and the haze anisotropy is developed due to the difference between the refractive index of the oriented crystals and the refractive index of fibril structure or other amorphous parts. For example, in the case of a polymer film exhibiting positive birefringence like polyethylene terephthalate (PET), haze is high against linearly polarized light having the vibration plane of electric field in the direction of orientation, and haze is low against linearly polarized light having the vibration plane orthogonally crossing the direction of orientation.

Here, it is preferable that the oriented film is strongly stretched in either uniaxial direction. For example, besides a so-called uniaxially stretched film, therefore a uniaxially stretched film with constant width and a biaxially stretched film having a draw ratio of length to width of 1.5 or more are included.

The draw ratio in the direction of high draw ratio is preferably 1.5 or more. Further, the preferred draw ratio differs depending on conditions such as the kind of the polymer, an elongation temperature and an elongation speed; for example, in the case of a polyester film, it is preferably 3 or more.

There is no limitation for such an oriented film of a crystalline polymer; however, examples include films made of substantially transparent or semi-transparent crystalline polymers, that is, a polyester film made of polyethylene terephthalate, polyethylene naphthalate or the like, a syndiotactic polystyrene film, a polyethylene film, a polypropylene film and the like. Especially a polyethylene terephthalate film and a polyethylene naphthalate film are preferable since the refractive index differences between crystalline parts and amorphous parts are large.

A polymer film of the group (ii) is a film having liquid crystals dispersed in it and satisfying the following formulae (3) against specific linearly polarized light $$|n1_A - n1_B| < 0.02, \text{ and } |n2_A - n2_B| > 0.02 \tag{3}$$

wherein $n1_A$ and $n1_B$ are independently refractive indexes of a polymer A and a liquid crystal B against linearly polarized light of the specific direction, respectively, and $n2_A$ and $n2_B$ are independently refractive indexes of the polymer A and the liquid crystal B against linearly polarized light of the direction perpendicular to the above linearly polarized light, respectively. The film can be obtained commonly by stretching a film having liquid crystals dispersed in the polymer.

Such a polymer film preferably satisfies the following formulae (3-1)

$$|n1_A - n1_B| < 0.01, \text{ and } |n2_A - n2_B| > 0.01 \tag{3-1}$$

This film commonly has high haze against linearly polarized light having a vibration plane of electric field which is parallel to the stretching direction when a liquid crystal having positive birefringence and a polymer matrix having positive birefringence are used. Liquid crystal molecules having anisotropy in refractive index are aligned by stretching, and the stretched film has haze anisotropy due to refractive index difference between the aligned liquid crystal molecules and the polymer matrix.

It is preferable that $n1_A$ is substantially equal to $n1_B$. Further, it is preferable that the difference between $n2_A$ and $n2_B$ is larger. That is, the above-mentioned film satisfies $n1_A \sim n1_B$ against specific linearly polarized light, and satisfies $n2_A \neq n2_B$ against linearly polarized light perpendicular to said linearly polarized light. In other words, there is a direction in which refractive indexes of matrix A and domain B are equal to each other in a plane of the above-mentioned oriented film, and this enables the development of haze anisotropy.

It is preferable that this film is strongly stretched and oriented in either uniaxial direction. For example, besides a so-called uniaxially stretched film, therefore a uniaxially stretched film with constant width and a biaxially stretched film having a draw ratio of length to width of 1.5 or more are included. The draw ratio in the direction of high draw ratio is preferably 1.5 or more.

The raw material for the polymer film is, for example, polyester, polyvinyl alcohol or the like.

An oriented film of the group (iii) has polymer chains which have been oriented by the stretching or the like of a film made of a resin composition containing a transparent polymer C in an amount of 99.9 to 50% by weight and a transparent polymer D substantially incompatible with said polymer in an amount of 0.1 to 50% by weight, and satisfies the following formulae (4) against specific linearly polarized light, $$|n1_C - n1_D| < 0.02, \text{ and } |n2_C - n2_D| > 0.02 \tag{4}$$

wherein $n1_C$ and $n1_D$ are independently refractive indexes of the polymer C and the polymer D against linearly polarized light of the specific direction, respectively, and $n2_C$ and $n^2 D$ are independently refractive indexes of the polymer C and the polymer D against linearly polarized light of the direction perpendicular to said linearly polarized light, respectively.

It is preferable that $n1_C$ is substantially equal to $n1_D$. Further, it is preferable that the difference between $n2_C$ and $n2_D$ is larger. That is, the above-mentioned film satisfies $n1_C \sim n1_D$ against specific linearly polarized light, and satisfies $n2_C \neq n2_D$ against linearly polarized light perpendicular to said linearly polarized light.

Such an oriented film preferably satisfies the following formulae (4-1).

$$|n1_C - n1_D| < 0.01, \text{ and } |n2_C - n2_D| > 0.01 \tag{4-1}$$

There is a direction in which refractive indexes of a matrix C and a domain D are equal to each other in a plane of the above-mentioned film, and this enables the development of haze anisotropy.

It is preferable that this film is strongly stretched and oriented in either uniaxial direction. For example, besides a so-called uniaxially stretched film, therefore a uniaxially stretched film with constant width and a biaxially stretched film having a draw ratio of length to width of 1.5 or more are included. The draw ratio in the direction of high draw ratio is preferably 1.5 or more.

The blending quantity of the polymer D to the polymer C is 0.1 to 50% by weight. When it is less than 0.1% by weight, the haze anisotropy to be obtained will be insufficient. It is preferably 1 to 49% by weight, more preferably 1 to 30% by weight.

In said oriented film, the polymer D is dispersed in the matrix of the polymer C in a state of islands. The shapes of the polymer D are generally ovals having the major axis in the stretching direction, and the average diameter is preferably 0.4 to 400 μm. When it is less than 0.4 μm, the optical effect is sometimes inert, and when it is larger than 400 μm, the anisotropy in haze is sometimes insufficient. More preferably, it is 1 to 50 μm.

There is no special limitation for such polymers C and D as long as they are transparent, but when $Tg_C$ and $Tg_D$ are glass transition temperatures respectively of the polymers C and D, the following formula (5) is satisfied.

$$Tg_C > Tg_D \tag{5}$$

This shows that the polymer D dispersed in the polymer C also can be stretched at the elongation temperature of the polymer C, which is a matrix resin. More preferably, they satisfy the following formula (5-1).

$$Tg_C > Tg_D + 20° \text{ C.} \tag{5-1}$$

Here, when the film is stretched under the condition where the polymer C, which is a matrix resin, can be stretched, the polymer D, which is a dispersed resin, is stretched under flow stretching; and when the stretching satisfies the condition $n1_C \sim n1_D$, the value $|n2_C - n2_D|$ becomes larger, and this is preferable. The elongation temperature is generally higher than TgC, and equal to or lower than TgC+50°.

There is no special limitation for the method for preparing said oriented film, but examples of the method include the stretching of a blend film prepared from the above-mentioned resin composition by a melt film-production method or a solution cast method.

There is no special limitation for the polymer C, but a transparent polymer having a relatively high Tg is preferred. Examples of the polymer C are a polyester such as polyethylene terephthalate or polynaphthalene terephthalate, a polyethersulfone, a polycarbonate, a polyester carbonate, a polysulfone and a polyacrylate.

A transparent polymer having a lower Tg than the polymer C is selected as the polymer D. For example, the polymers C and D preferably satisfy the following formula (5-2).

$$250° \text{ C.} > Tg_C > Tg_D + 10° \text{ C.} > 50° \text{ C.} \tag{5-2}$$

Preferable examples of the polymer D are a polyester, a polycarbonate, a polyacrylate and a polystyrene, their copolymer, and the like. It is recommended to select a combination of the polymer C and the polymer D so that the obtained film satisfies the above-mentioned conditions, that is, $n1_C \approx n1_D$ and $n2_A \neq n2_B$ when a film made of a resin composition consisting of the polymers C and D is stretched.

A film of the group (iv) is obtained by stretching a polymer film containing a dispersed transparent filler in an amount of 1 ppm to 30% by weight to orientate polymer chains. Further, the film satisfies the following formulae (6) against specific linearly polarized light, $$|n1_E - n1_F| < 0.02, \text{ and } |n2_E - n2_F| > 0.02 \tag{6}$$

wherein $n1_E$ and $n1_F$ are independently refractive indexes of the polymer E and the filler F against linearly polarized light of the specific direction, respectively, and $n2_E$ and $n2_F$ are independently refractive indexes of the polymer E and the filler F against linearly polarized light of the direction perpendicular to said linearly polarized light, respectively.

Here, it is preferable that $n1_E$ is substantially equal to $n1_F$. Further, it is preferable that the difference between $n2_E$ and $n2_F$ is larger. That is, the above-mentioned film satisfies $n1_E \sim n1_F$ against specific linearly polarized light, and satisfies $n2_E \neq n2_F$ against linearly polarized light perpendicular to said linearly polarized light.

Such an oriented film preferably satisfies the following formulae (6-1).

$$|n1_E - n1_F| < 0.01, \text{ and } |n2_E - n2_F| > 0.01 \tag{6-1}$$

In the above film, there is a direction in which reflective indexes of the matrix E and the domain F are equal to each other in a plane, and haze anisotropy is developed by this. In other words, the film has differences of reflective indexes between the filler E and the matrix E in some directions, and this enables the development of the haze anisotropy.

The polymer E is, for example, a polyester such as PET or PEN, or the like.

The filler F must satisfy the above formulae (6) and be optically transparent. Examples of the filler F include inorganic oxides such as silicon oxide and silicone, clay minerals such as kaolin, polymer compounds such as crosslinked polystyrene and the like. Further, the size of the filler is suitably 0.1 to 30 μm. There is no special limitation for the shape of the filler, and it may be spherical, cylindrical or the like.

Blending quantity of the filler F to the polymer E is 1 ppm to 30% by weight. When it is less than 1 ppm, the haze anisotropy to be developed is not sufficient, and when it is 30% by weight or more, the haze anisotropy becomes insufficient due to multiple scattering. It is preferably 10% by weight or less.

Further, this film is preferably strongly stretched in either uniaxial direction. For example, besides a so-called uniaxially stretched film, therefore a uniaxially stretched film with constant width and a biaxially stretched film having a draw ratio of length to width of 1.5 or more are included. The draw ratio in the direction of high draw ratio is preferably 1.5 or more. In addition, the preferred draw ratio differs depending on conditions such as the kind of the polymer, an elongation temperature and an elongation speed; for example, in the case of a polyester film, it is preferably 2 or more.

The thickness of the haze anisotropic film of the present invention is 0.1 to 200 μm, preferably 10 to 100 μm.

There is no special limitation regarding the raw material for an adhesive layer to adhere the above film on a transparent medium, but the adhesive layer having a reflective index which is close to those of the transparent medium and the film is preferred. The adhesive layer can be formed by using an adhesive, for example, like an acrylic resin, which is basically transparent in optical use. The thickness of such an adhesive is 0.1 to 100 μm, preferably 1 to 50 μm.

Further, considering the effect of polarized light separation by boundary reflection, said haze anisotropic film can be laminated into a multiple layer through adhesive layer. In this case, the directions of haze anisotropy of these films, concretely the scattering axes, are preferably arranged in one direction.

The haze anisotropic film preferably has forward scattering property. Letting a total light transmittance in the direction of the scattering axis be TTmin, and a total light transmittance in the direction of transmission axis be TTmax, the following formula (8) is satisfied.

$$1 \leq TT\text{max}/TT\text{min} \leq 2 \tag{8}$$

The haze anisotropic film of the present invention differs from a scatter-type polarizing plate in this point. In the case of the scatter-type polarizing plate, the larger the difference of transmission is, the more preferable it is, but in the case of this haze anisotropic film, the smaller the difference, the more preferable it is. That is, it is preferable to satisfy the following formula (8-1), $$1 \leq TT\text{max}/TT\text{min} \leq 1.5 \tag{8-1}$$

ideally the following formula (8-2) is satisfied.

$$TT\text{max}=TT\text{min} \tag{8-2}$$

Further, it is one of the characteristic properties of the present invention that the above film has a high transmittance. Letting a total light transmittance in the direction of the scattering axis be TTmin, and a total light transmittance in the direction of transmission axis be TTmax, the following formula (9) is preferably satisfied, $$(TT\text{max}+TT\text{min})/2 \geq 70(\%) \tag{9}$$

more preferably, the following formula (9-1) is satisfied.

$$(TT\text{max}+TT\text{min})/2 \geq 80(\%) \tag{9-1}$$

In the above-mentioned film satisfying these conditions, the scattering effect largely varies depending on the vibration direction of polarized light, but the amount of transmission of the total light is not affected by the plane of polarization since the scattering is mainly forward scattering. In other words, this film has low backward scattering, of course, in the direction of the transmission axis, but also in the direction of the scattering axis.

In these points, the haze anisotropic film of the present invention differs from a so-called scatter-type polarizing film in characteristic properties. That is, since the haze anisotropic film of the present invention uses the linearly polarized light of the direction of the scattering axis, it is preferable that the transmission TTmin in the direction of scattering axis is rather large as shown above, and ideally TTmax=TTmin~100%. In other words, in the direction of the scattering axis, the larger the haze value showing the degree of scattering is, the better it is; however, it is preferable that the scattering is not backward scattering but forward scattering, and it does not lower the transmittance.

Thus, the present invention provides the use of a haze-anisotropic polymer film whose haze value varies depending on the vibration direction of linearly polarized light incident perpendicularly on the surface and satisfies the following formula (2)

$$H\text{max}/H\text{min} \geq 1.05 \tag{2}$$

and the following formula (8)

$$1 \leq TT\text{max}/TT\text{min} \leq 2 \tag{8}$$

in such a state that it is in contact with the surface of a transparent medium constituting a light guide body through an adhesive layer in order to scatter mainly linearly polarized light of one vibration direction and emit it from said light guide body (wherein Hmax is a haze value in the direction having the largest haze value, and Hmin is a haze value in the direction having the smallest haze value, and a haze value is expressed by the following formula (1) when an incident light is a lineally polarized light, $$H(\%)=DF/TT \times 100 \tag{1}$$

wherein DF is a diffused light transmittance and TT is a total light transmittance, and TTmax is a total light transmittance in the direction having the smallest haze value, and TTmin is a total light transmittance in the direction having the largest haze value).

Further, the light source device of the present invention becomes a surface light source for emitting polarized light of one vibration direction having a high degree of polarization δ(%) based on the above-mentioned principle.

Wherein the degree of polarization δ(%) is determined by the following formula (7).

$$\text{Degree of polarization } \delta(\%)=\{(\text{the maximum luminance}-\text{the minimum luminance})/(\text{the maximum luminance}+\text{the minimum luminance})\} \times 10 \tag{7}$$

The maximum luminance is the luminance at the position where the luminance is the largest when a polarizing plate is rotated in a plane, and the minimum luminance is the luminance at the position where the luminance is the smallest. The present invention enables the obtaining of a high degree of polarization δ(%) such as 25% or more, preferably 35% or more.

One embodiment of the light source device of the present invention is a surface light source device containing a light guide plate of an end-face light introducing-type comprising a transparent medium, a reflecting plate placed on the opposite side of the emission face of the light guide plate and a cylindrical light source lamp mounted on an end face of the light guide plate as main constituting components. It is a polarizing surface light source device having the following features: a haze anisotropic layer whose haze value varies depending on the vibration direction of linearly polarized light is placed on at lest one side of the surfaces of the light guide plate, and thereby the linearly polarized light parallel to the direction (scattering axis) having the largest haze value in the haze anisotropic layer is emitted out of unpolarized light propagating through the light guide plate, through scattering. A haze anisotropic film applied on the surface of the transparent medium through an adhesive layer is preferably used as the haze anisotropic layer.

The present invention provides a guide light body comprising medium, and having an end face through which the light emitted from a light source can be introduced and at the same time the above-mentioned haze anisotropic layer (wherein, the haze value is defined as above).

The present invention further provides a light guide body comprising a transparent medium, and having an end face through which the light emitted from a light source can be introduced and a pair of opposing faces one of which works as a light emission face, and the light guide body has properties that it scatters and emits mainly linearly polarized light of one vibration direction, and hardly emits transmission light nor linearly polarized light of other vibration directions than said one vibration direction.

The present invention furthermore provides a light source device suitable for a liquid crystal display element containing the above-mentioned light guide body as a constituting component.

In addition, the present invention provides a method for separating linearly polarized light including following features: a haze anisotropic layer comprising a transparent medium whose haze value varies depending on the vibration direction of a linearly polarized light is placed on a light guide body through which unpolarized light is propagated; and thereby linearly polarized light having a vibration plane in the direction of a large haze value in the haze anisotropic layer is scattered out of the unpolarized light propagating through the light guide body, and it is emitted.

The light source device of the present invention can emit selectively linearly polarized light having a vibration plane of an electric field always in a direction of a high haze value (the direction of scattering axis) regardless of the direction where the haze anisotropic layer is placed. In this point, the method of the present invention is substantially different from the methods described in the above-mentioned publications of WO97/32222, JP-A 8-76114 and JP-A 9-297204, and it is clear from the descriptions of below mentioned examples and Comparative Examples 3 to 5 that the vibration plane of the obtained linearly polarized light is shifted by 90 degree from the vibration plane of the linearly polarized light which is obtained in the above-mentioned conventional patent technologies.

The light source device of the present invention can make a liquid crystal display device high in contrast and low in power consumption by using it as a backlight of the liquid crystal display device. The utilization efficiency of the light source light can be improved by making the polarization axis of polarized light emitted from the light source device coincident with the polarization axis of a dichroic polarizing plate.

By using an anisotropic light-scattering film, the light source device of the present invention can correct the light emission direction to the front direction without disturbing polarized light; the disturbance usually occurs in a light source device using a scattering film on which polymer beads are added or applied, and the disturbance causes depolarization to convert polarized light to a unpolarized state. Here, the anisotropic scattering film means a film having characteristic properties in which the scattering of light varies depending on the incident angle of light. Such a film is, for example, a porous oriented film disclosed in the publication of WO98/05984. It is more preferable that such an anisotropic scattering film is placed on the light emission face side of a light guide body and at the same time the light emission face side of the above-mentioned haze anisotropic film.

Further, the light source device of the present invention can use together a so-called prism sheet in order further to correct an emission direction and to improve luminance. In this case, the prism sheet itself is preferably of low-retardation in order to keep polarized light.

EXAMPLES

The present invention will be explained further in detail hereafter with examples, while the present invention is not restricted by the examples.

1. Glass transition temperature (Tg) was determined by using a DSC2920 modulated DSC manufactured by TA Instrument at a heating rate of 10° C./min.

2. Weight average molecular weight was determined according to GPC method at a flow velocity of 1 ml/sec by dissolving a sample film in methylene chloride and using TSK-gel G2000H as a column.

3. A haze value and a total light transmittance were measured by using a digital haze meter (NDH-20D manufactured by Nippon Denshoku Kogyo Co., Ltd.) under conditions that a polarizing plate was placed on the incident light side and polarized light was made perpendicularly incident on the surface of a film. When measurement was carried out letting linearly polarized light having the vibration plane of electric field in MD direction be the incident light, the obtained value was let be $H_{MD}$, and when measurement was carried out letting linearly polarized light having the vibration plane of electric field in TD direction be the incident light, the obtained value was let be $H_{TD}$. Further, in the following examples, $H_{MD}$=Hmax, and $H_{TD}$=Hmin were assumed. In addition, the total light transmittance was let to be TTmin in the case where polarized light in MD direction was made incident on the film, and the total light transmittance was let to be TTmax in the case where polarized light in TD direction was made incident on the film. Here, MD means machine direction, and TD means transverse direction.

4. A refractive index was measured by using ATAGO abbe refractometer 2-T manufacture by ATAGO Co., Ltd.

5. Luminance was determined by using a luminance meter LS-110 manufactured by MINOLTA Co., Ltd. A polarizing plate was placed on the emission face (film placing face) of a light guide plate, the luminance of polarized light coming out from the emission face was measured while rotating the polarizing plate, and the degree of polarization was calculated from the luminance by the following formula (7).

Degree of polarization $\delta(\%)=\{$(the maximum luminance−the minimum luminance)/(the maximum luminance+the minimum luminance)$\}\times 100$     (7)

Here, the maximum luminance was the luminance at the position (angle) where the luminance was the largest when the polarizing plate was rotated in a plane, and the minimum luminance was the luminance at the position (angle) where the luminance was the smallest.

6. The average diameter of island-shaped polymers dispersed in a polymer was determined by using a real time scanning laser microscope 1LM21D manufactured by Lasertec Corporation.

7. Following polymers were used.
(1) Polyethylene terephthalate (PET) manufactured by Teijin Ltd., Tg=75° C.
(2) Polyethylene naphthalate (PEN) manufactured by Teijin Ltd., Tg=118° C.
(3) Polyvinyl alcohol (PVA); "PVA-117" manufactured by Kurarey Co., Ltd., Tg=70° C.
(4) Polyester carbonate (PEC) having a structure expressed by the following formula,

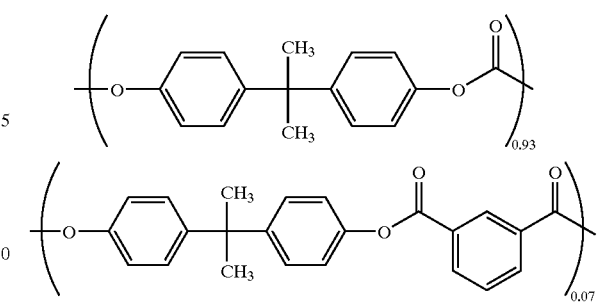

the weight-average molecular weight=200,000, and Tg=162° C.
(5) Polycarbonate (PC); Panlite "C-1400" manufactured by Teijin Chemicals Co., Ltd., Tg=155° C.

(6) Polystyrene (PSt); Denka Styrol manufactured by Denki Kagaku Kogyo K.K., Tg=90° C.

Synthetic Example 1

Eighty-three parts by weight of styrene monomer and 20 parts by weight of methyl methacrylate (monomer) were dissolved in 50 parts by weight of THF, and they were made to react with each other at 90° C. for 8 hr after the addition of 0.2 part by weight of benzoyl peroxide as a reaction initiator. After the reaction, the reaction mixture was diluted by adding THF, and the mixture was poured into methanol to precipitate the product. Further, the product was recovered by filtration followed by drying. The obtained copolymer had a refractive index of 1.572 and Tg of 102° C.

Synthetic Example 2

A copolymer was produced through the same process as in Synthetic Example 1 except that 77 parts by weight of styrene monomer and 26 parts by weight of methyl methacrylate were used. The obtained copolymer had a refractive index of 1.564 and Tg of 103° C.

Example 1

To PET, 0.15% by weight of spherical silicon oxide (Seehostar KE-E30 supplied by Nippon Shokubai Co., Ltd.) was added as an additive, and the mixture was extruded under kneading to produce a film. The film was subjected to a uniaxial stretching at 100° C. at a draw ratio of 3.6 to obtain a stretched film of 55 μm in thickness. The haze value and light transmittance of the film were measured.

A light guide plate was produced by applying the obtained uniaxially stretched film on the upper surface of an acrylic plate of 80 mm×80 mm×2 mm with an adhesive ("SK dyne" 1811L supplied by Soken Chemical and Engineering Co., Ltd.). The thickness of the adhesive layer was 2 μm. Subsequently, a cylindrical light source lump (CFL) having a pipe diameter of 3 mm and a pipe length of 100 mm as shown in FIG. 1, and having a central brightness of 10,000 cd/m² was mounted at the light-introducing end face of the light guide plate. In this case, the longitudinal direction of CFL and the MD direction of the above film applied on the acrylic plate were made parallel to each other. The part which was not facing to the light guide plate of the light source lump, the end faces other than the light-introducing face of the light guide plate and the opposite face to the face on which the above film was applied, which was the light emission face, were covered with aluminum deposited film.

By using a so-produced surface light source device, brightness was measured and a degree of polarization was determined. The results of the measurements are shown in Table 1 and Table 2.

Example 2

A procedure was carried out in the same manner as in Example 1 except that the uniaxial draw ratio was 4.0. The results are shown in Table 1 and Table 2.

Example 3

The evaluation was carried out carried out in the same procedure as in Example 1 except that the film was produced without adding an additive to PET and the film was subjected to a uniaxial stretching at 100° C. at a draw ratio of 3.0 to obtain a stretched film of 55 μm in thickness.

Example 4

A film was prepared by adding 40 ppm of a spherical silica as an additive and extruding under kneading in the same procedure as in Example 1. The film was subjected to uniaxial stretching at 145° C. at a raw ratio of 4.0 to obtain a stretched film of 75 μm in thickness. Results are shown in Table 1 and Table 2.

Example 5

A film was prepared in the same procedure as in Example 3 except that no additive was used. The thickness of the obtained film was 75 μm in thickness. The results are shown in Table 1 and Table 2.

Example 6

A film was prepared in the same procedure as in Example 5 except that the draw ratio was 3.6. The thickness of the obtained film was 55 μm. The results are shown in Table 1 and Table 2.

Example 7

To a solution prepared by dissolving 10 parts by weight of PVA under heating in 90 parts by weight of water was added 1 part by weight of a liquid crystal (BL036 supplied by Merck & Co., Inc.), and the mixture was dispersed by using a homogenizer. The suspension was cast on a polycarbonate film, which was used as a support. This was dried at 60° C., subsequently subjected to a heat treatment at 130° C. for 1 min, and the film was peeled from the polycarbonate film. The formed film was subjected to uniaxial stretching at 110° C. at a draw ratio of 5 to obtain a stretched film of 43 μm in thickness. Haze value, light transmittance and degree of polarization were determined on the film in the same manner as in Example 1. Further, the refractive index $n1_{MD}$ of the liquid crystal component and the refractive index $n2_{MD}$ of the PVA in MD direction, and the refractive index $n1_{TD}$ of the liquid crystal component and the refractive index $n2_{TD}$ of the PVA in TD direction were determined. The results are shown in Table 1 and Table 2.

Example 8

A film was prepared in the same procedure as in Example 7 except that the liquid crystal was used in an amount of 2 parts by weight. The film was subjected to uniaxial stretching at 110° C. at a draw ratio of 6 to obtain a stretched film of 74 μm in thickness. The obtained film was evaluated in the same manner as in Example 5.

Example 9

A solution prepared by dissolving 10 parts by weight of the copolymer synthesized in Synthetic Example 1 and 90 parts by weight of PEC in 600 parts by weight of methylene chloride was cast on a glass plate, and this was dried to prepare a film. The obtained film was subjected to uniaxial stretching at 190° C. at a draw ratio of 2.0. Haze value, light transmittance and degree of polarization were determined on the stretched film in the same manner as in Example 1.

Further, on the stretched film, the refractive index $n1_{MD}$ of the copolymer and the refractive index $n2_{MD}$ of the PEC in MD direction, and the refractive index $n1_{TD}$ of the copolymer and the refractive index $n2_{TD}$ of the PEC in TD direction were determined. The results are shown in Table 1 and Table 2.

Example 10

A stretched film was prepared in the same procedure as in Example 9 except that the copolymer was used in an amount of 5 parts by weight, and PEC in an amount of 95 parts by weight. The results are shown in Table 1 and Table 2.

Example 11

A stretched film was prepared in the same procedure as in Example 9 except that the copolymer was used in an amount of 1 part by weight, and PEC in an amount of 99 parts by weight. The results are shown in Table 1 and Table 2.

Example 12

A solution prepared by dissolving 5 parts by weight of the copolymer synthesized in Synthetic Example 2 and 95 parts by weight of PC in 400 parts by weight of methylene chloride was cast on a glass plate, and this was dried to prepare a film. The obtained film was subjected to uniaxial stretching at 180° C. at a draw ratio of 1.75. By using the stretched film, haze value, light transmittance, degree of polarization and refractive indexes were determined in the same manner as shown above. Further, on the stretched film, let the refractive index of the copolymer and the refractive index of the PC in MD direction be $n1_{MD}$ and $n2_{MD}$, respectively, and let the refractive index of the copolymer and the refractive index of the PC in TD direction be $n1_{TD}$ and $n2_{TD}$, respectively.

Example 13

The same procedure was carried out as in Example 12 except that the amount of the copolymer was 1 part by weight and that of PC was 99 parts by weight.

Example 14

The mixture of 10 parts by weight of PSt and 90 parts by weight of PEN was kneaded under heating at 300° C. by using a biaxial extruding kneader PCM-30 manufactured by Ikegai Corp. to prepare a film. The obtained film was subjected to uniaxial stretching at 130° C. at a draw ratio of 5 at an elongation speed of 1 cm/sec to prepare a stretched film. By using the stretched film, haze value, light transmittance, refractive index and degree of polarization were determined in the same manner as above-mentioned procedure. Further, let the refractive index of PSt and the refractive index of the PEN in MD direction be $n1_{MD}$ and $n2_{MD}$, respectively, and let the refractive index of PSt and the refractive index of the PEN in TD direction be $n1_{TD}$ and $n2_{TD}$, respectively. The results are shown in Table 1 and Table 2.

Example 15

The same procedure was carried out as in Example 14 except that the amount of PSt was 5 parts by weight, and that of PEN was 95 parts by weight.

TABLE 1

| | (1) | (2) | (3) | (4) | (5) | (6) | (7) | (8) |
|---|---|---|---|---|---|---|---|---|
| S. Ex. 1 | St/MMA = 83/20 n = 1.572 | | | | | | | |
| S. Ex. 2 | St/MMA = 77/26 n = 1.564 | | | | | | | |
| Ex. 1 | PET | 0.16 wt. % | 3.6 (100° C.) | | 52 | 13.1 | 4.7 | 2.79 |
| Ex. 2 | PET | 0.16 wt. % | 4.0 (100° C.) | | 49 | 18.7 | 7.3 | 2.55 |
| Ex. 3 | PET | none | 3.0 (100° C.) | 55 | 38 | 3.7 | 3.6 | 1.03 |
| Ex. 4 | PEN | 40 ppm | 4.0 (145° C.) | 75 | 60 | 7.2 | 4.0 | 1.75 |
| Ex. 5 | PEN | none | 4.0 (145° C.) | 75 | 58 | 3.6 | 2.1 | 1.75 |
| Ex. 6 | PEN | none | 3.6 (145° C.) | 55 | 51 | 4.6 | 3.4 | 1.35 |
| Ex. 7 | PVA (10) | LC (1) | 5.0 (110° C.) | 43 | 81 | 90.0 | 21.0 | 4.30 |
| Ex. 8 | PVA (10) | LC (2) | 6.0 (110° C.) | 74 | 56 | 91.0 | 34.0 | 2.71 |
| Ex. 9 | PEC | S. Ex. 1: 10% | 2.0 (190° C.) | — | 85 | 39.0 | 14.0 | 2.79 |
| Ex. 10 | PEC | S. Ex. 1: 5% | 2.0 (190° C.) | — | 79 | 36.0 | 21.0 | 1.71 |
| Ex. 11 | PEC | S. Ex. 1: 1% | 2.0 (190° C.) | — | 76 | 20.0 | 16.0 | 1.25 |
| Ex. 12 | PC | S. Ex. 2: 5% | 1.75 (180° C.) | — | 80 | 45.0 | 23.0 | 1.96 |
| Ex. 13 | PC | S. Ex. 2: 1% | 1.75 (180° C.) | — | 73 | 23.0 | 14.0 | 1.64 |
| Ex. 14 | PEN | PSt 10% | 5.0 (145° C.) | — | 58 | 86.0 | 18.0 | 4.79 |
| Ex. 15 | PEN | PSt 5% | 5.0 (130° C.) | — | 88 | 62.0 | 7.0 | 8.86 |
| C. Ex. 1 | acrylic plate | | | | 0 | | | |
| C. Ex. 2 | PC | none | 1.75 (180° C.) | | 18 | | | |
| C. Ex. 3 | case 1 | | | | 20 | | | |
| C. Ex. 4 | case 2 | | | | 28 | | | |
| C. Ex. 5 | case 3 | | | | 28 | | | |

(1) means 'polymer'.
(2) means 'additive'.
(3) means 'draw ratio (elongation temperature)'.
(4) means 'thickness (μm)'.
(5) means 'degree of polarization (%)'.
(6) means '$H_{MD}$'.
(7) means '$H_{TD}$'.
(8) means '$H_{MD}/H_{TD}$'.
S. Ex. means 'Synthetic Example'.
Ex. means 'Example'.
C. Ex. means 'Comparative Example'.
Case 1: the film of Ex. 7 was placed without sticking together.
Case 2: the film of Ex. 12 was placed without sticking together.
Case 3: light was made incident perpendicularly upon the film of Ex. 7

TABLE 2

| | (1) | (2) | (3) | (4) | (5) | (6) | (7) | (8) | (9) | (10) | (11) | (12) |
|---|---|---|---|---|---|---|---|---|---|---|---|---|
| S. Ex. 1 | (A) | | | | | | | | | | | |
| S. Ex. 2 | (B) | | | | | | | | | | | |
| Ex. 1 | PET | 0.16 wt. % | 3.6 (100° C.) | | | | | | 91.4 | 88.0 | 1.04 | 89.70 |
| Ex. 2 | PET | 0.16 wt. % | 4.0 (100° C.) | | | | | | 90.9 | 86.2 | 1.05 | 88.53 |
| Ex. 3 | PET | none | 3.0 (100° C.) | | | | | | 91.7 | 90.4 | 1.01 | 91.06 |
| Ex. 4 | PEN | 40 ppm | 4.0 (145° C.) | | | | | | 91.3 | 85.6 | 1.07 | 88.45 |
| Ex. 5 | PEN | none | 4.0 (145° C.) | | | | | | 91.1 | 86.4 | 1.05 | 88.72 |
| Ex. 6 | PEN | none | 3.6 (145° C.) | | | | | | 90.7 | 86.9 | 1.04 | 88.82 |
| Ex. 7 | PVA (10) | LC (1) | 5.0 (110° C.) | 1.77 | 1.53 | 1.55 | 1.53 | | 90.4 | 50.8 | 1.78 | 70.60 |
| Ex. 8 | PVA (10) | LC (2) | 6.0 (110° C.) | 1.77 | 1.53 | 1.55 | 1.53 | | 88.2 | 28.3 | 3.12 | 58.25 |
| Ex. 9 | PEC | S. Ex. 1: 10% | 2.0 (190° C.) | 1.57 | 1.572 | 1.62 | 1.572 | 11/0.7 | 91.3 | 89.7 | 1.02 | 90.50 |
| Ex. 10 | PEC | S. Ex. 1: 5% | 2.0 (190° C.) | 1.57 | 1.572 | 1.62 | 1.572 | 8/0.4 | 89.6 | 88.6 | 1.01 | 89.10 |
| Ex. 11 | PEC | S. Ex. 1: 1% | 2.0 (190° C.) | 1.57 | 1.572 | 1.62 | 1.572 | 8/0.4 | 90.4 | 89.4 | 1.01 | 89.90 |
| Ex. 12 | PC | S. Ex. 2: 5% | 1.75 (180° C.) | 1.56 | 1.564 | 1.61 | 1.564 | 7/2 | 92.1 | 89.5 | 1.03 | 90.80 |
| Ex. 13 | PC | S. Ex. 2: 1% | 1.75 (180° C.) | 1.56 | 1.564 | 1.61 | 1.564 | 7/2 | 91.5 | 90.8 | 1.01 | 91.15 |
| Ex. 14 | PEN | PSt 10% | 5.0 (145° C.) | 1.58 | 1.583 | >1.8 | 1.583 | 11/7 | 92.0 | 51.5 | 1.79 | 71.75 |
| Ex. 15 | PEN | PSt 5% | 5.0 (130° C.) | 1.58 | 1.583 | >1.8 | 1.583 | 11/7 | 92.3 | 67.0 | 1.38 | 79.67 |
| C. Ex. 1 | acrylic plate | | | | | | | | | | | |
| C. Ex. 2 | PC | none | 1.75 (180° C.) | | | | | | | | | |

(1) means 'polymer'.
(2) means 'additive'.
(3) means 'draw ratio (elongation temperature)'.
(4) means '$n1_{MD}$'.
(5) means '$n1_{TD}$'.
(6) means '$n2_{MD}$'.
(7) means '$n2_{TD}$'.
(8) means 'particle size ($\mu$m): major axis/minor axis'.
(9) means 'TTmax'.
(10) means 'TTmin'.
(11) means 'TTmax/TTmin'.
(12) means '(TTmax + TTmin)/2'.
S. Ex. means 'Synthetic Example'.
Ex. means 'Example'.
C. Ex. means 'Comparative Example'.
(A) means 'St/MMA = 83/20, n = 1.572'.
(B) means 'St/MMA = 77/26, n = 1.564'.

Example 16

On the film obtained in Example 2, the front luminance which emits from the film was determined while a polarizing plate was rotated at a pitch of 15 degree. The profile is shown in FIG. 6.

Examples 17 and 18

Luminance was determined in the same manner as in Example 16 except that the MD direction of the film was 45 degree (Example 17) or 90 degree (Example 18) to the CFL.

Example 19

On the film obtained in Example 5, the front luminance was determined in the same manner as in Example 16. The obtained profile is shown in FIG. 6.

Examples 20 and 21

The luminance was determined in the same manner as in Example 19 except that the MD direction of the film was 45 degree (Example 20) or 90 degree (Example 21) to the CFL.

Comparative Example 1

On the light guide plate of the acrylic plate used in Example 1, the degree of polarization of the emission light was determined in the same manner as in Example 1. The result is shown in Table 1.

Comparative Example 2

On the film obtained by subjecting a PC film to a uniaxial stretching at 180° C. at a draw ratio of 1.75, the degree of polarization of emission light was determined in the same manner as in Example 1. The result is shown in Table 1.

Comparative Example 3

The stretched film obtained in Example 5 was simply placed on a commercial light guide plate with a dot-pattern for an end-face light introducing-type backlight without sticking together and used as a scatter-type polarizing plate, and it was evaluated in the same manner as described above. The obtained degree of polarization is shown in Table 1. In this case, the plane of polarization was different from that of Example 5 by 90°. This shows that the polarizing plate of the present invention is quite different from a conventional scatter-type polarizing plate in the principle of polarized light separation. Further, the degree of polarization was extremely lower than that of Example 7, which used the same film. In this case, the cause of the differences from the present invention is attributable to the existence of an air layer between the light guide plate and the film.

Comparative Example 4

The stretched film obtained in Example 14 was simply placed on a commercial light guide plate with a dot-pattern for an end-face light introducing-type backlight without sticking together and used as a scatter-type polarizing plate. Also in this case, the same result as in Comparative Example 3 was obtained, and the plane of polarization was different from that of Example 14 by 90°.

Comparative Example 5

Light was made incident perpendicularly upon the film of Example 7, and the degree of polarization was determined.

Thus obtained linearly polarized light was different from the linearly polarized light of Example 7 by 90° in polarization axis. Further, it was parallel to the linearly polarized light of Comparative Example 3.

Industrial Field of Application

As explained above, the light source device of the present invention can convert unpolarized light effectively into polarized light and take it out, owing to that a haze anisotropic layer is imparted to a light guide body for a conventional light source device of an end-face light introducing-type. Further, when the light source device of the present invention is applied to a liquid crystal display device, the utilization efficiency of light can be increased by making the polarizing axis of the light source device coincident with the polarizing axis of a dichroic polarizing plate which is placed at the side of the light source device, and as a result, a liquid crystal display device having high contrast can be provided.

What is claimed is:

1. A liquid crystal display element including:
   (I) a light source device comprising the following (i) to (iii):
      (i) a light guide body comprising a transparent medium, and having an end face through which the light emitted from a light source can be introduced, a pair of opposing faces one of which works as a light emission face and a haze anisotropic layer, wherein the haze value is expressed by the following formula (1) when the incident light is linearly polarized light, $$H(\%)=DF/TT \times 100 \tag{1}$$

wherein, DF is a diffused light transmittance, and TT is a total light transmittance, and the haze value varies depending on a vibration direction of the linearly polarized light,
      (ii) a light source placed at the end face of said light guide body, and
      (iii) a reflecting body placed at the opposite side of the light emission face side of said light guide body, and
   (II) a polarizing plate placed at the light emission face side of the above-mentioned light guide body in such a manner that the polarization axis is parallel to the direction having the largest haze value in the above-mentioned haze anisotropic layer,
      wherein the light source device emits mainly the linearly polarized light having a vibration plane parallel to the direction having the largest haze value in the haze anisotropic layer, and characterized in that the haze anisotropic layer comprises a polymer film satisfying the following formula (2)

$$H\text{max}/H\text{min} \geq 1.05 \tag{2}$$

wherein Hmax is the haze value in the direction having the largest haze value, and Hmin is the haze value in the direction having the smallest haze value, and said polymer film is in contact with the surface of the transparent medium through an adhesive layer.

2. A liquid crystal display element according to claim 1 characterized in that the light source device scatters and emits mainly linearly polarized light of one vibration direction, and hardly emits linearly polarized light of any other vibration direction than said one vibration direction.

3. A liquid crystal display element according to claim 1 characterized in that the haze anisotropic layer is placed on the light emission face of the light guide body.

4. A light source device comprising:
   (i) a light guide body comprising a transparent medium, and having an end face through which the light emitted from a light source can be introduced, a pair of opposing faces one of which works as a light emission face and a haze anisotropic layer, wherein the haze value is expressed by the following formula (1) when the incident light is linearly polarized light, $$H(\%)=DF/TT \times 100 \tag{1}$$

here, DF is a diffused light transmittance, and TT is a total light transmittance, and the haze value varies depending on a vibration direction of the linearly polarized light, and
   (ii) a light source placed at the end face of said light guide body,
      wherein the light source device emits mainly linearly polarized light having a vibration plane parallel to the direction having the largest haze value in the haze anisotropic layer, and characterized in that the haze anisotropic layer comprises a polymer film satisfying the following formula (2)

$$H\text{max}/H\text{min} \geq 1.05 \tag{2}$$

wherein Hmax is the haze value in the direction having the largest haze value, and Hmin is the haze value in the direction having the smallest haze value, and said polymer film is in contact with the surface of the transparent medium through an adhesive layer.

5. A light source device according to claim 4 characterized in that the light source device scatters and emits mainly linearly polarized light of one vibration direction, and hardly emits linearly polarized light of any other vibration direction than said one vibration direction.

6. A light source device, scattering and emitting mainly linearly polarized light of one vibration direction, and substantially not emitting transmission light, said light source device comprising:
   (i) a light guide plate comprising a transparent medium, and having an end face through which the light emitted from a light source may be introduced, a pair of opposing faces one of which works as a light emission face and a haze anisotropic layer,
      wherein the haze value is expressed by the following formula (1) when the incident light is linearly polarized light $$H(\%)=DF/TT \times 100 \tag{1}$$

wherein, DF is a diffused light transmittance, and TT is a total light transmittance, and the haze value varies depending on the vibration direction of the linearly polarized light, and
      the haze anisotropic layer comprises a polymer film which is in contact with the surface of the transparent medium through an adhesive layer and satisfies the following formula (2)

$$H\text{max}/H\text{min} \geq 1.05 \tag{2}$$

wherein Hmax is the haze value in the direction having the largest haze value, and
      Hmin is the haze value in the direction having the smallest haze value,
   (ii) a light source placed at the end face of said light guide plate, and (iii) a reflecting plate placed on the opposite face side to the emission face side of said light guide plate.

7. A light guide body comprising a transparent medium, and having an end face through which the light emitted from a light source can be introduced and a haze anisotropic layer,
wherein the haze value is expressed by the following formula (1) when the incident light is linearly polarized light, $$H(\%)=DF/TT\times100 \qquad (1)$$

wherein DF is a diffused light transmittance, and TT is a total light transmittance, and the haze value varies depending on a vibration direction of the linearly polarized light,
wherein the haze anisotropic layer comprises a polymer film, and the polymer film is in contact with a surface of the transparent medium through an adhesive layer, and characterized in that the haze anisotropic layer satisfies the following formula (2)

$$H\max/H\min \geq 1.05 \qquad (2)$$

wherein Hmax is the haze value in the direction having the largest haze value, and Hmin is the haze value in the direction having the smallest haze value.

8. A light body guide according to claim 7 characterized in that the polymer film is an oriented film of a crystalline polymer.

9. A light guide body according to claim 8 characterized in that the crystalline polymer is a polyester.

10. A light guide body according to claim 7 characterized in that the polymer film comprises a polymer A including dispersed liquid crystallines B and is an oriented film satisfying the following formulae (3) against specific linearly polarized light $$|n1_A-n1_B|<0.02, \text{ and } |n2_A-n2_B|>0.02 \qquad (3)$$

wherein $n1_A$ and $n1_B$ are independently refractive indexes of the polymer A and the liquid crystal B against linearly polarized light of a specific direction, respectively, and $n2_A$ and $n2_B$ are independently refractive indexes of the polymer A and the liquid crystal B against linearly polarized light of the direction perpendicular to the above-mentioned linearly polarized light, respectively.

11. A light guide body according to claim 7 characterized in that the polymer film is made of a resin composition comprising by weight 99.9 to 50% transparent polymer C and 0.1 to 50% transparent polymer D which is substantially incompatible with said polymer C, and is an oriented film satisfying the following formulae (4) against specific linearly polarized light $$|n1_C-n1_D|<0.02, \text{ and } |n2_C-n2_D|>0.02 \qquad (4)$$

wherein $n1_C$ and $n1_D$ are independently respectively refractive indexes of the polymers C and D against linearly polarized light of a specific direction, and $n2_C$ and $n2_D$ are independently respectively refractive indexes of the polymers C and D against linearly polarized light of the direction perpendicular to the above-mentioned linearly polarized light.

12. A light guide body according to claim 11, wherein the polymer C is at least one kind selected from a group consisting of polyesters, polycarbonates and polyester carbonates.

13. A light guide body according to claim 11 characterized in that the polymer film has a structure that the polymer D having an average diameter of 0.4 to 400 μm is dispersed in a sea consisting of the polymer C in a state of islands.

14. A light guide body according to claim 11 characterized in that the polymers C and D satisfy the following formula (5)

$$Tg_C>Tg_D \qquad (5)$$

wherein $Tg_C$ and $Tg_D$ are glass transition temperatures of the polymers C and D, respectively.

15. A light guide body according to claim 14 characterized in that the polymers C and D satisfy the following formula (5-1)

$$250°\ C.>Tg_C>Tg_D+10°\ C.>50°\ C. \qquad (5\text{-}1)$$

wherein $Tg_C$ and $Tg_D$ are glass transition temperatures of the polymers C and D, respectively.

16. A light guide body according to claim 7 characterized in that the polymer film is made of a polymer E containing 1 ppm to 30% by weight of a transparent filler and is a film satisfying the following formulae (6) against specific linearly polarized light $$|n1_E-n1_F|<0.02, \text{ and } |n2_E-n2_F|>0.02 \qquad (6)$$

wherein $n1_E$ and $n1_F$ are independently respectively refractive indexes of the polymer E and the filler F against linearly polarized light of a specific direction, and $n2_E$ and $n2_F$ are independently respectively refractive indexes of the polymer E and the filler F against linearly polarized light of the direction perpendicular to the above-mentioned linearly polarized light.

17. A light guide body according to claim 16 characterized in that the polymer is a polyester.

18. A light guide body according to claim 7 characterized in that the degree of polarization δ(%) of the emitted polarized light is 25% or more,
wherein the degree of polarization is determined by the following formula (7)

degree of polarization δ(%)={(the maximum luminance−the minimum luminance)/(the maximum luminance+the minimum luminance)}×100 (7)

and the maximum luminance is the luminance at the position where the luminance is the largest when a polarizing plate is rotated in a plane, and the minimum luminance is the luminance at the position where the luminance is the smallest.

19. A light guide body according to claim 7 characterized in that it converts the light introduced through the end face, into linearly polarized light of one vibration direction having a vibrating plane parallel to the direction having the largest haze value in the haze anisotropic layer and emits it, and hardly emits linearly polarized light of any other vibration direction than said one vibration direction.

20. A method of using a polymer film having haze anisotropy satisfying the following formula (2)

$$H\max/H\min\geq1.05 \qquad (2)$$

and the following formula (8)

$$1\leq TT\max/TT\min\leq2 \qquad (8)$$

said method comprising contacting said polymer film with a surface of a transparent medium constituting a light guide body through an adhesive layer in order to scatter mainly linearly polarized light of one vibration direction and emit it from the light guide body, wherein Hmax is the haze value in the direction having the largest haze value, and Hmin is the haze value in the direction having the smallest haze value, and the haze value varies depending on a vibration direction of the linearly polarized light, and is expressed by the following formula (1) when the incident light is linearly polarized light, $$H(\%) = DF/TT \times 100 \qquad (1)$$

wherein, DF is a diffused light transmittance, TT is a total light transmittance, TTmax is the total light transmittance in the direction having the smallest haze value, and TTmin is the total light transmittance in the direction having the largest haze value.

21. A liquid crystal display element including:

(I) a light source device comprising the following (i) to (iii):
  (i) a light guide body comprising a transparent medium, and having an end face through which the light emitted from a light source can be introduced, a pair of opposing faces one of which works as a light emission face and a haze anisotropic layer, wherein the haze value is expressed by the following formula (1) when the incident light is linearly polarized light, $$H(\%) = DF/TT \times 100 \qquad (1)$$

wherein, DF is a diffused light transmittance, and TT is a total light transmittance, and the haze value varies depending on a vibration direction of the linearly polarized light,
  (ii) a light source placed at the end face of said light guide body, and
  (iii) a reflecting body placed at the opposite side of the light emission face side of said light guide body, and (II) a polarizing plate placed at the light emission face side of the above-mentioned light guide body in such a manner that the polarization axis is parallel to the direction having the largest haze value in the above-mentioned haze anisotropic layer, wherein the haze anisotropic layer comprises a polymer film satisfying the following formula (2)

$$H\max/H\min \geq 1.05 \qquad (2)$$

wherein Hmax is the haze value in the direction having the largest haze value, and Hmin is the haze value in the direction having the smallest haze value, and said polymer film is in contact with the surface of the transparent medium through an adhesive layer.

* * * * *